(12) United States Patent
Ishida et al.

(10) Patent No.: US 10,976,742 B2
(45) Date of Patent: Apr. 13, 2021

(54) SHIP HANDLING DEVICE

(71) Applicant: Yanmar Co., Ltd., Osaka (JP)

(72) Inventors: Hiroyasu Ishida, Osaka (JP); Akiyoshi Hayashi, Osaka (JP); Toshiaki Naega, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 218 days.

(21) Appl. No.: 16/084,910

(22) PCT Filed: Mar. 10, 2017

(86) PCT No.: PCT/JP2017/009834
§ 371 (c)(1),
(2) Date: Sep. 13, 2018

(87) PCT Pub. No.: WO2017/159579
PCT Pub. Date: Sep. 21, 2017

(65) Prior Publication Data
US 2019/0079197 A1 Mar. 14, 2019

(30) Foreign Application Priority Data
Mar. 14, 2016 (JP) .............................. JP2016-050319

(51) Int. Cl.
*G05D 1/02* (2020.01)
*B63H 25/42* (2006.01)
(Continued)

(52) U.S. Cl.
CPC ........... *G05D 1/0208* (2013.01); *B63H 25/04* (2013.01); *B63H 25/42* (2013.01); *G08G 3/00* (2013.01); *B63H 2025/045* (2013.01)

(58) Field of Classification Search
CPC .. B63H 2025/045; B63H 25/04; B63H 25/42; G05D 1/0208
See application file for complete search history.

(56) References Cited

U.S. PATENT DOCUMENTS 8,694,248 B1 4/2014 Arbuckle et al.
9,529,089 B1 * 12/2016 Buether .................. G01S 19/05

FOREIGN PATENT DOCUMENTS

EP 0518146 A2 12/1992
EP 0518146 A3 12/1992
(Continued)

OTHER PUBLICATIONS

European Search Report dated Feb. 5, 2019 issued in corresponding EP Application 17766579.1 cites the patent documents above.
(Continued)

*Primary Examiner* — Bernarr E Gregory
*Assistant Examiner* — Fred H Mull
(74) *Attorney, Agent, or Firm* — Norton Rose Fulbright US LLP

(57) ABSTRACT

A ship handling device executing dynamic positioning control with which the fixed-point maintaining accuracy including measurement accuracy of a satellite positioning system can be assessed. In this ship handling device for maintaining a ship body at a target position using a GNSS (Global Navigation Satellite System) device, a positioning accuracy level of the GNSS device is calculated based on a radio-wave reception state of the GNSS device, a fixed-point deviation amount level is calculated based on a fixed-point deviation amount calculated based on the target position and a measured position measured by the GNSS device, and a fixed-point maintaining accuracy level indicative of an assumed range of an absolute position of the ship body relative to the target position is determined with reference to the positioning accuracy level and the fixed-point deviation amount level.

20 Claims, 11 Drawing Sheets

(51) Int. Cl.
　　　*G08G 3/00*　　　　(2006.01)
　　　*B63H 25/04*　　　(2006.01)

(56)　　　　References Cited

FOREIGN PATENT DOCUMENTS

| | | |
|---|---|---|
| EP | 2677277 A1 | 12/2013 |
| JP | 1988-000281 U | 1/1988 |
| JP | 1993-073521 U | 10/1993 |
| JP | 07-280931 A | 10/1995 |
| JP | 2001-281331 A | 10/2001 |
| JP | 3499204 B | 2/2004 |
| JP | 2011-137708 A | 7/2011 |
| JP | 2012-185154 A | 9/2012 |
| WO | 2016/068275 A1 | 5/2016 |

OTHER PUBLICATIONS

International Search Report dated May 23, 2017 issued in corresponding PCT Application PCT/JP2017/009834.

* cited by examiner

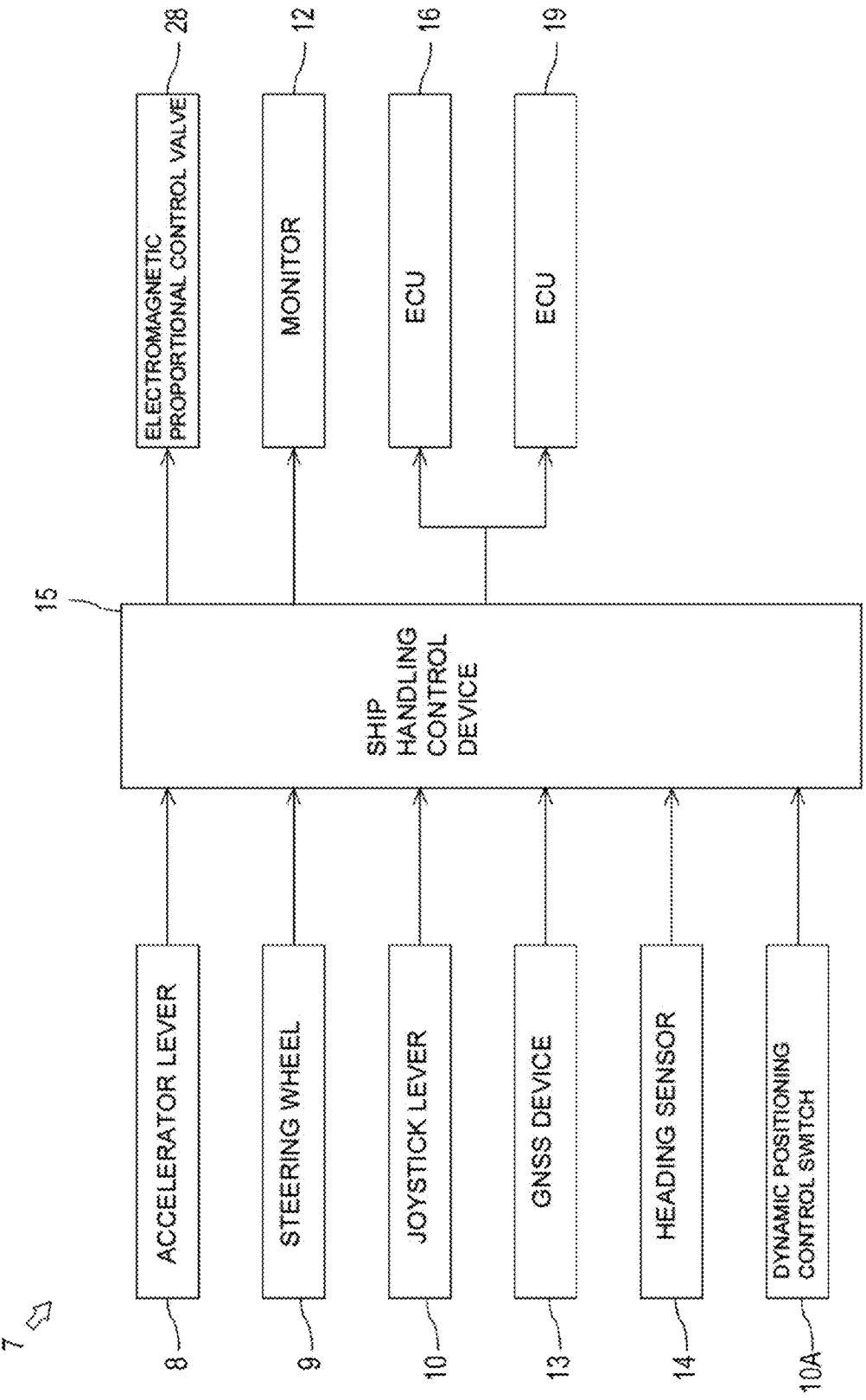

| POSITIONING ACCURACY LEVEL 19 | | MAINTAINING ACCURACY | PERIOD AFTER POWER-ON | HDOP | THE NUMBER OF EFFECTIVE SATELLITES |
|---|---|---|---|---|---|
| ACCURACY | LEVEL 1 | $\leq \pm A$ | $T1 \leq T$ | $HDOP \leq \alpha$ | $S1 \leq S$ |
| | LEVEL 2 | $\leq \pm B$ | $T1 \leq T$ | $HDOP \leq \beta$ | $S2 \leq S$ |
| | LEVEL 3 | $\leq \pm C$ | $T1 \leq T$ | $HDOP \leq \gamma$ | $S3 \leq S$ |
| | LEVEL 4 | $> \pm C$ | $T < T1$ | $HDOP > \gamma$ | $S < S3$ |

| | FIXED-POINT DEVIATION AMOUNT LEVEL 20 | MAINTAINING ACCURACY | FIXED-POINT DEVIATION AMOUNT |
|---|---|---|---|
| ACCURACY | LEVEL 1 | $\leq A$ | $L \leq L1$ |
| | LEVEL 2 | $\leq B$ | |
| | LEVEL 3 | $\leq C$ | $L1 < L \leq L2$ |
| | LEVEL 4 | $> C$ | $L2 < L$ |

| ACCURACY | ORIENTATION ACCURACY LEVEL 23 | MAINTAINING ACCURACY | ORIENTATION DIFFERENCE | |
|---|---|---|---|---|
| | | ≤A | -R1≤R≤R1 | |
| | | ≤B | -R2≤R<-R1 | R1<R≤R2 |
| | | ≤C | -R3≤R<-R2 | R2≤R<R3 |
| | | >C | -R3>R | R3<R |

# SHIP HANDLING DEVICE

CROSS REFERENCES TO RELATED APPLICATIONS

This application is a national stage application pursuant to 35 U.S.C. § 371 of International Application No. PCT/JP2017/009834, filed on Mar. 10, 2017, which claims priority under 35 U.S.C. § 119 to Japanese Patent Application No. 2016-050319, filed on Mar. 14, 2016, the disclosures of which are hereby incorporated by reference in their entireties.

TECHNICAL FIELD

The present invention relates to a ship handling device for performing dynamic positioning control for use in ships and the like.

BACKGROUND ART

Heretofore, there has been disclosed a method for performing dynamic positioning control for a ship by which a ship body is controlled to be maintained at a fixed point through detection of a position of the ship body by, e.g., global positioning system (GPS) and monitoring of the position. According to the dynamic positioning control, based on a deviation between a position command value and a ship-body position signal from the GPS, a controller drives an actuator to maintain the ship body at a fixed point.

CITATION LIST

Patent Literature

PTL 1: Japanese Patent No. 3499204

SUMMARY OF INVENTION

Technical Problem

According to the above-described method for performing the dynamic positioning control for the ship, due to an external force, a deviation may sometimes occur between a target position (position command value) in the dynamic positioning control and a measured position of the ship. In addition, during the dynamic positioning control, depending on a measurement accuracy of a satellite positioning system such as GPS, a deviation may potentially occur between an absolute position (a position uniquely defined on the earth) of the ship body and a measured position of the ship body obtained by the satellite positioning system. In order to deal with this, some aspects of the present invention have an object to provide a ship handling device capable of performing dynamic positioning control with which an accuracy in maintaining a ship at a fixed point (i.e., a fixed-point maintaining accuracy), including a measurement accuracy of a satellite positioning system, can be assessed.

Solution to Problem

A ship handling device according to an aspect of the present invention is a ship handling device for performing dynamic positioning control for maintaining a ship body at a target position with use of a satellite positioning system, wherein a positioning accuracy level of the satellite positioning system is calculated based on a radio-wave reception state of the satellite positioning system, a fixed-point deviation amount level is calculated based on a fixed-point deviation amount calculated from the target position and a measured position measured by the satellite positioning system, and a fixed-point maintaining accuracy level indicative of an assumed range of an absolute position of the ship body relative to the target position is determined with reference to the positioning accuracy level and the fixed-point deviation amount level.

The ship handling device according to the aspect of the present invention is preferably configured such that the positioning accuracy level and the fixed-point deviation amount level are compared to each other such that in a case where the positioning accuracy level is lower than the fixed-point deviation amount level, the positioning accuracy level is determined as the fixed-point maintaining accuracy level, in a case where the fixed-point deviation amount level is lower than the positioning accuracy level, the fixed-point deviation amount level is determined as the fixed-point maintaining accuracy level, and in a case where the positioning accuracy level and the fixed-point deviation amount level are equal to each other, the positioning accuracy level and the fixed-point deviation amount level are determined as the fixed-point maintaining accuracy level.

The ship handling device according to the aspect of the present invention preferably further includes a notification means for notifying an operator of the fixed-point maintaining accuracy level.

The ship handling device according to the aspect of the present invention is preferably configured such that the radio-wave reception state of the satellite positioning system is determined based on an elapsed time after power-on of the satellite positioning system, a dilution of precision observed at the time of determination of a position in a horizontal plane and is received from the satellite positioning system, and the number of effective satellites for the satellite positioning system.

Advantageous Effects of Invention

The ship handling device according to the aspect of the present invention allows an operator to easily assess an assumed range of an absolute position of a ship body relative to a target position, thereby making the operator alert to the situation.

BRIEF DESCRIPTION OF DRAWINGS

FIG. 4 is a block diagram illustrating a control system related to the ship handling device.

DESCRIPTION OF EMBODIMENTS

Figure 1:
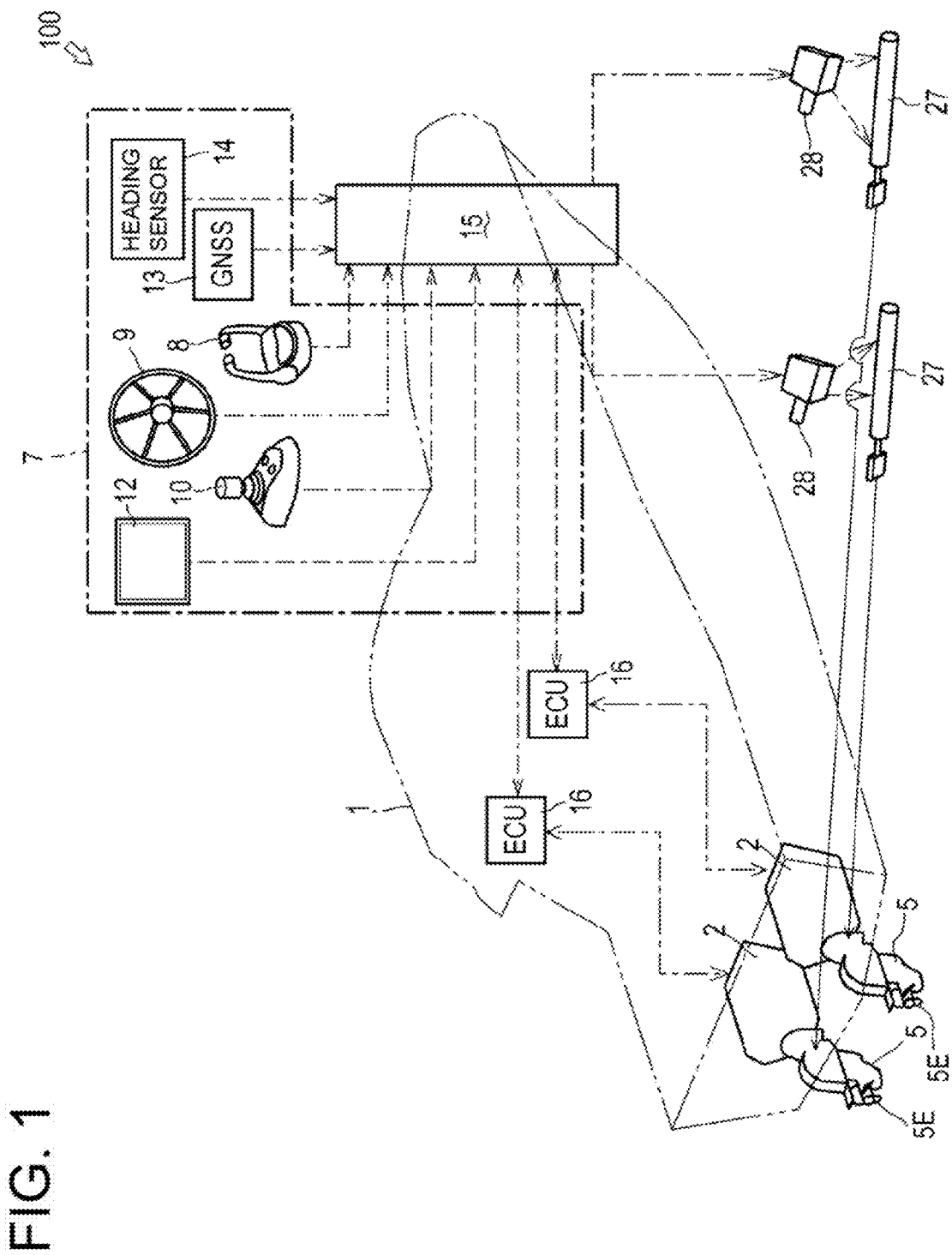
FIG. 1 is a view schematically illustrating an overview of an entire ship provided with a ship handling device.

First, with reference to FIGS. 1 to 4, an overview and a configuration of an entire ship 100 provided with a ship handling device 7 will be described. The ship 100 illustrated in FIG. 1 is a so-called twin-screw ship. However, the number of propeller shafts is not limited to two, but may be any number as long as the number is two or more. In the present embodiment, a front-and-back direction and a left-and-right direction are defined with a bow direction of the ship 100 being defined as the front.

Figure 2:
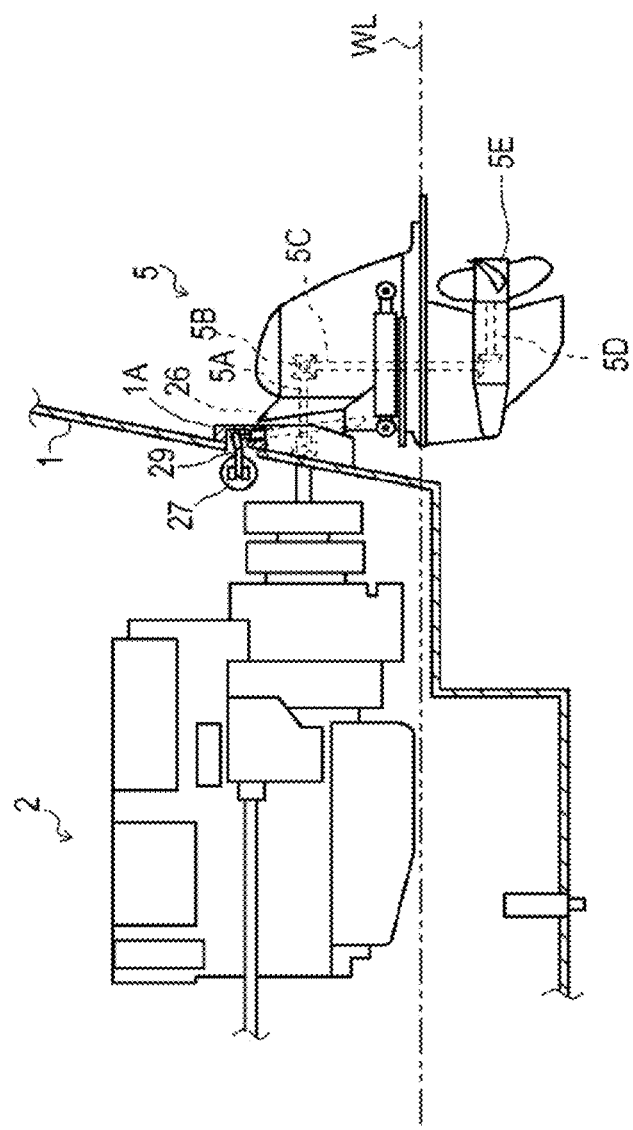
FIG. 2 is a view schematically illustrating arrangement of engines and outdrive devices of the ship provided with the ship handling device.

As illustrated in FIGS. 1 and 2, the ship 100 is a stern drive ship provided with outdrive devices 5 configured to generate a thrust by propulsion propellers 5E rotated by driving power from engines 2. The ship 100 includes a ship body 1 provided with a propulsion device and the ship handling device 7. The propulsion device includes the engines 2, the outdrive devices 5, and electronic control units (ECUs) 16. The ship handling device 7 includes an accelerator lever 8, a steering wheel 9, a joystick lever 10, a monitor 12, a global navigation satellite system (GNSS) device 13, a heading sensor (orientation sensor) 14, and a ship handling control device 15. In the present embodiment, the ship 100 is the stern drive ship provided with the outdrive devices 5. However, the ship 100 is not limited to this. Alternatively, the ship 100 may be a shaft ship or the like.

Each of the outdrive devices 5 is mainly constituted by an input shaft 5A connected to an output shaft of a corresponding one of the engines 2, a switching clutch 5B, a propeller shaft 5D to which driving power is transmitted from the input shaft 5A via a drive shaft 5C, and a propulsion propeller 5E fixed to the propeller shaft 5D. The outdrive device 5 is interlocked and coupled to the engine 2 in a one-to-one relation. Note that the number of outdrive devices 5 with respect to the engine 2 is not limited to the number defined in the present embodiment. Note also that the drive device is not limited to the outdrive device 5 of the present embodiment. Alternatively, a drive device in which a propeller is directly or indirectly driven by an engine may be employed. Further alternatively, a drive device of pod drive type may be employed.

Each of the two engines 2 generates driving power for rotating a corresponding one of the propulsion propellers 5E on the port side and the starboard side. One of the engines 2 is disposed in a rear portion of the port side of the ship body 1, and the other of the engines 2 is disposed in a rear portion of the starboard side of the ship body 1.

Each of the two switching clutches 5B switches the driving power, transmitted from the output shaft of a corresponding one of the engines 2, between a forward rotation direction and a reverse rotation direction, and outputs the resulting driving power. Each of the switching clutches 5B has a forward bevel gear and a reverse bevel gear coupled to an inner drum including disc plates. The switching clutch 5B switches the rotational direction from one to another by selecting, among the disc plates, a disc plate onto which a pressure plate in an outer drum coupled to the input shaft 5A is pressed.

Each of the two propulsion propellers 5E rotates to generate thrust power. Each of the propulsion propellers 5E is driven by the driving power transmitted thereto from a corresponding one of the engines 2. Multiple blades arranged around the propeller shaft 5D rotate in water in the periphery, so that thrust power is generated.

Each of the outdrive devices 5 is supported by a gimbal housing 1A attached to a stern board (transom board) of the ship body 1. Specifically, the outdrive device 5 is supported by the gimbal housing 1a such that a gimbal ring 26, which serves as a rotating fulcrum shaft of the outdrive device 5, is substantially vertical to a waterline WL.

The gimbal ring 26 has an upper edge to which a steering arm 29 is attached, the steering arm 29 extending to the inside of the ship body 1. The steering arm 29 causes the outdrive device 5 to turn around the gimbal ring 26. The steering arm 29 is driven by a hydraulic actuator 27 that is configured to operate according to an operation made with the steering wheel 9 or the joystick lever 10. The hydraulic actuator 27 is driven by an electromagnetic proportional control valve 28 configured to switch a flow direction of a hydraulic oil according to an operation made with the steering wheel 9 or the joystick lever 10.

The accelerator lever 8 included in the ship handling device 7 generates a signal for a rotation speed of the propulsion propeller 5E on the port side, a signal for a rotation speed of the propulsion propeller 5E on the starboard side, and signals for rotation directions of these propulsion propellers 5E. The accelerator lever 8 includes a lever for the propulsion propeller 5E on the port side and a lever for the propulsion propeller 5E on the starboard side. That is, the accelerator lever 8 is configured to independently generate a signal for the propulsion propeller 5E on the port side and a signal for the propulsion propeller 5E on the starboard side. The accelerator lever 8 is configured to be inclined at a desired angle in the front-and-rear direction of the ship 100. The accelerator lever 8 is configured to independently generate signals for rotation speeds of the engines 2 and signals for switching states of the switching clutches 5B corresponding to the engines 2, based on the operation direction and the operation amount. When the accelerator lever 8 is operated to be inclined forward, the accelerator lever 8 generates signals for the propulsion propellers 5E to generate a thrust for causing the ship 100 to move forward. Meanwhile, when the accelerator lever 8 is operated to be inclined rearward, the accelerator lever 8 generates signals for the propulsion propellers 5E to generate a thrust for causing the ship 100 to move backward.

The steering wheel 9 included in the ship handling device 7 is used to change turning angles of the outdrive devices 5. When the steering wheel 9 is turned rightward, the outdrive devices 5 are turned so that the bow of the ship 100 is directed rightward. Similarly, when the steering wheel 9 is turned leftward, the outdrive devices 5 are turned so that the bow of the ship 100 is directed leftward.

Figure 3:
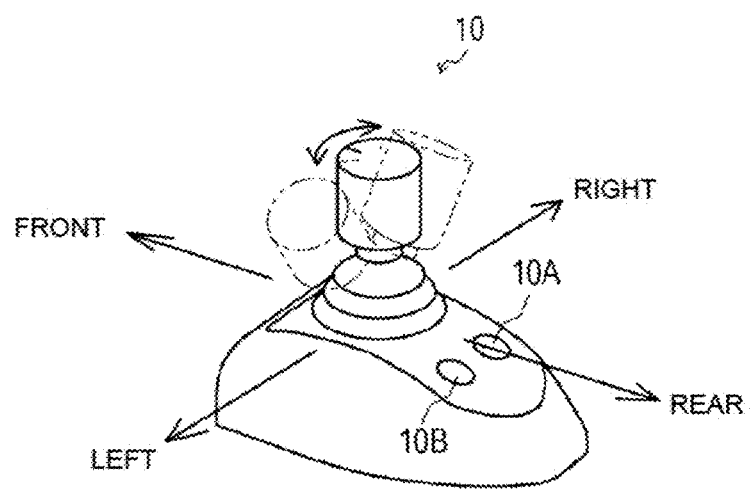
FIG. 3 is a perspective view illustrating a configuration of a joystick lever of the ship handling device.

As illustrated in FIGS. 1 and 3, the joystick lever 10 included in the ship handling device 7 generates a signal for causing the ship 100 to move in a desired direction. The joystick lever 10 can be inclined in a desired direction at a desired angle. The joystick lever 10 can be operated to turn about a lever axis at a desired angle. The joystick lever 10 is configured to generate signals for the engines 2 and the outdrive devices 5B, based on the operation mode and the operation amount. Specifically, when the joystick lever 10 is operated to be inclined in a desired direction, the joystick lever 10 generates signals for the propulsion propellers 5E on both sides to cause the ship 100 to move in a direction corresponding to the operation with a thrust corresponding to the amount of the operation. When the joystick lever 10 is operated to turn about the lever axis, the joystick lever 10 generates signals for the propulsion propellers 5E on both sides to cause the ship 100 to turn in a desired direction with a thrust corresponding to the operation amount.

The joystick lever 10 is provided with a dynamic positioning control switch 10A for setting target coordinates for dynamic positioning control and a setting switch 10B for performing various settings such as calibration for lateral movement, oblique movement, and turning of the ship 100. The dynamic positioning control switch 10A generates a signal for starting the dynamic positioning control. The configurations of the various switches provided to the joystick lever 10 are not limited to those described above. Alternatively, for example, additional switches for changing the various settings may be provided to the joystick lever. Further alternatively, the various switches may be provided on the display or in the vicinity of the display.

The GNSS device 13, which is a satellite positioning system included in the ship handling device 7, receives a positioning signal broadcasted from a positioning satellite, and measures (calculates) positional coordinates of the ship 100. The positioning satellite refers to a GNSS satellite that may be a GPS satellite and the like. The GNSS device 13 receives signals from a plurality of satellites, calculates positional coordinates of the ship 100, and outputs a latitude La (n) and a longitude Lo (n) representing the current position. That is, the GNSS device 13 calculates absolute values of the positional coordinates of the ship 100.

The heading sensor 14, which is an orientation sensor included in the ship handling device 7, measures (calculates) a direction of the ship 100. The heading sensor 14 calculates an orientation of the bow of the ship 100 based on the Earth's magnetic field and/or GNSS. That is, the heading sensor 14 calculates an absolute orientation of the bow of the ship 100. The heading sensor 14 may be, e.g., a satellite compass (Registered Trademark) that calculates the orientation with use of the GNSS device 13.

As illustrated in FIG. 1, each of the ECUs 16 controls a corresponding one of the engines 2. In each of the ECUs 16, various programs and data for controlling a corresponding one of the engines 2 are stored. The ECUs 16 are provided for their respective engines 2. Each of the ECUs 16 may have a configuration in which a CPU, a ROM, a RAM, an HDD and/or the like are connected to each other via a bus, or may have a configuration including a single-chip LSI and/or the like.

Each of the ECUs 16 is connected to components of a corresponding one of the engines 2, such as a fuel adjustment valve of a fuel supply pump, a fuel injection valve, and various sensors (these components are not illustrated). Thus, the ECU 16 can control a supply amount of the fuel adjustment valve and opening/closing of the fuel injection valve, and also can obtain information detected by various sensors.

The ship handling control device 15 included in the ship handling device 7 controls the engines 2 and the outdrive devices 5 based on signals detected by, e.g., the accelerator lever 8, the steering wheel 9, and the joystick lever 10. The ship handling control device 15 may be configured to be capable of performing so-called automatic navigation that enables automatic handling of the ship along a route calculated from the current position and the preset destination based on the information from the GNSS device 13.

In the ship handling control device 15, various programs and data for controlling the engines 2 and the outdrive device 5 are stored. The ship handling control device 15 may have a configuration in which a CPU, a ROM, a RAM, an HDD, and/or the like are connected to each other via a bus, or may have a configuration including a single-chip LSI and/or the like.

The ship handling control device 15 is connected to the ECUs 16, and can obtain information indicative of states of the switching clutches 5B, information indicative of operation states of the engines 2, information indicative of rotation speeds of the engines 2 that the ECUs 16 obtain from various sensors, and various signals that the ECUs 16 obtain from various sensors.

The ship handling control device 15 can transmit, to the switching clutches 5B, signals for changing (switching) clutch states.

The ship handling control device 15 is connected to the electromagnetic proportional control valves 28 of the outdrive devices 5, and is capable of controlling the electromagnetic proportional control valves 28 according to signals from the steering wheel 9, the joystick lever 10, and the like.

The ship handling control device 15 can transmit, to the ECUs 16, signals for controlling the fuel adjustment valves of the fuel supply pumps, the fuel injection valves, and other various devices of the engines 2.

The ship handling control device 15 is connected to the accelerator lever 8 and the joystick lever 10, so that the ship handling control device 15 can obtain signals from the acceleration lever 8 and the joystick lever 10.

The ship handling control device 15 is connected to the GNSS device 13 and the heading sensor 14, so that the ship handling control device 15 can obtain absolute coordinates and an absolute orientation of the ship 100.

The ship handling control device 15 is connected to the monitor 12, so that a measured position of the ship 100 and/or a ship handling state achieved with the joystick lever 10 can be displayed.

Next, with reference to FIG. 4, the following will describe a configuration of the ship handling device 7 including the ship handling control device 15 that executes the dynamic positioning control for maintaining the ship body 1 at a target position by use of the satellite positioning system.

The ship handling control device 15 can calculate an external force acting on the ship 100 and a ship speed, based on the position information from the GNSS device 13 and the orientation information from the heading sensor 14.

Then, the ship handling control device 15 further calculates a setting value regarding thrust power for achieving balance with the external force thus calculated, and controls the ECUs 16 so that thrust power represented by the setting value is outputted.

The ship handling control device 15 is connected to the dynamic positioning control switch 10A. The ship handling control device 15 can recognize switchover of the dynamic positioning control switch 10A between on and off. The dynamic positioning control switch 10A is disposed at a location in the ship body 1 where the dynamic positioning control switch 10A is operable by an operator. Instead of the dynamic positioning control switch 10A attached to the joystick lever 10, the dynamic positioning control switch 10A may be an alternative one, e.g., the one displayed on the monitor 12 of touch panel type.

Figures 5A, 5B:
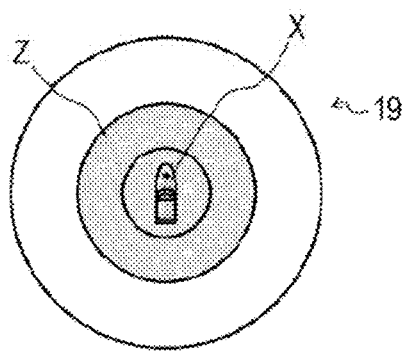
FIG. 5A is a table showing conditions of calculation of a positioning accuracy level, and 5B is a view schematically illustrating the positioning accuracy level.

With reference to FIG. 5A, the following will describe a positioning accuracy level 19.

The ship handling control device 15 calculates the positioning accuracy level 19 of the GNSS device 13 based on a reception state of radio waves by the GNSS device 13 (i.e., a radio-wave reception state of the GNSS device 13). The radio-wave reception state of the GNSS device 13 is defined by an elapsed time after power-on of the GNSS device 13, a dilution of precision (DOP) observed at the time of determination of a position in a horizontal plane and is received from the GNSS device 13, and the number of effective satellites for the GNSS device 13 (see FIG. 5A).

The elapsed time after power-on of the GNSS device 13 refers to a period of time (T) that has elapsed after the GNSS device 13 was powered on. For the elapsed time after power-on of the GNSS device 13, a threshold T1 regarding stable operation of the system of the GNSS device 13 is set. At the threshold T1 or higher, the system of the GNSS device 13 operates stably.

The dilution of precision observed at the time of determination of a position in a horizontal plane and is received from the GNSS device 13 refers to a horizontal dilution of precision (HDOP). DOP is a concept representing a positioning accuracy of the GNSS device 13. DOP represents a dilution of precision in positioning performed by the GNSS device 13. DOP is affected by arrangement of the GNSS satellites. HDOP represents, among a geometrical dilution of precision (GDOP) representing a dilution of precision observed at the time of determination of a position in three dimensions, a component in a horizontal direction.

The number of effective satellites for the GNSS device 13 refers to the number of satellites having an SNR value that is equal to or higher than a predetermined value. SNR refers to a ratio between a signal and a noise, that is, a signal-to-noise ratio. Namely, SNR represents an intensity of a signal from each satellite.

With the configuration described above, the positioning accuracy level 19 of the GNSS device 13 is calculated based on the radio-wave reception state defined by the elapsed time after power-on of the GNSS device 13, the dilution of precision observed at the time of determination of a position in a horizontal plane and is received from the GNSS device 13, and the number of effective satellites for the GNSS device 13.

Specifically, in a case where the elapsed time after power-on is expressed by T≥T1, HDOP is ≤α, and the number of effective satellites for the GNSS device 13 is expressed by S≥S1, the positioning accuracy level 19 is "high" (level 1). In a case where the elapsed time after power-on is expressed by T≥T1, HDOP is ≤β, and the number of effective satellites for the GNSS device 13 is expressed by S≥S2, the positioning accuracy level 19 is "intermediate" (level 2). In a case where the elapsed time after power-on is expressed by T≥T1, HDOP is ≤γ, and the number of effective satellites for the GNSS device 13 is expressed by S≥S3, the positioning accuracy level 19 is "low" (level 3). In a case where the elapsed time after power-on is expressed by T<T1, HDOP is >γ, or the number of effective satellites for the GNSS device 13 is expressed by S<S3, the positioning accuracy level 19 is "deviation" (level 4). Note that, a relation between the values of α, β, and γ is expressed by α<β<γ, and a relation between the values of S1, S2, and S3 is expressed by S1>S2>S3.

With reference to FIG. 5B, the following will further describe the positioning accuracy level 19.

The positioning accuracy level 19 refers to a degree of how far an absolute position Z (a position uniquely defined on the earth) of the ship 100 may potentially be away from a measured position X measured by the GNSS device 13. The positioning accuracy level 19 is set such that a positioning accuracy level 19 having a lower level represents a greater estimated distance from the measured position X to the absolute position Z.

Concentric circles indicative of a degree of how far the absolute position Z is away from the measured position X are provided. A plurality of (in the present embodiment, three) concentric circles are provided so that the number of concentric circles corresponds to the number of the positioning accuracy levels 19. A concentric circle at the innermost position has a radius A, a concentric circle at the middle position has a radius B, and a concentric circle at the outermost position has a radius C.

Specifically, in a case where the positioning accuracy level 19 is "high" (level 1), the absolute position Z of the ship 100 is estimated to be within the concentric circle at the innermost position. In a case where the positioning accuracy level 19 is "intermediate" (level 2), the absolute position Z of the ship 100 is estimated to be within the concentric circle at the middle position. In a case where the positioning accuracy level 19 is "low" (level 3), the absolute position Z of the ship 100 is estimated to be within the concentric circle at the outermost position. In a case where the positioning accuracy level 19 is "deviation" (level 4), the absolute position Z of the ship 100 cannot be estimated. The embodiment illustrated in FIG. 5B shows a state where the positioning accuracy level 19 is "intermediate".

Figures 6A, 6B:
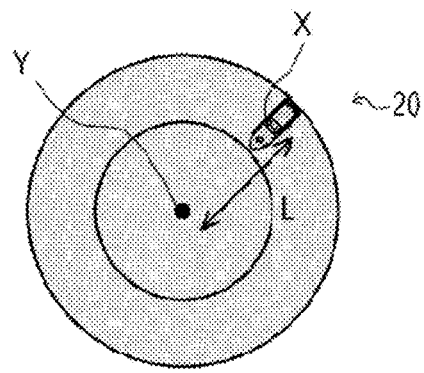
FIG. 6A is a table showing conditions of calculation of a fixed-point deviation amount level.
FIG. 6B is a view schematically illustrating the fixed-point deviation amount level.

With reference to FIGS. 6A and 6B, the following will describe a level 20 of an amount of deviation from a fixed point (i.e., a fixed-point deviation amount level 20).

The ship handling control device 15 calculates the fixed-point deviation amount level 20 based on an amount of deviation from a fixed point (i.e., a fixed-point deviation amount) that is measured by a measured position X measured by the GNSS device 13 and a target position Y that is set at the time of starting the dynamic positioning control (see FIG. 6B). The fixed-point deviation amount refers to a distance (L) between the measured position X measured by the GNSS device 13 and the target position Y.

The fixed-point deviation amount level 20 represents a degree (spacing degree) of how far the measured position X measured by the GNSS device 13 and the target position Y that is set at the time of starting the dynamic positioning control are away from each other. The fixed-point deviation amount level 20 is set such that a fixed-point deviation amount level 20 having a lower level represents a greater distance (fixed-point deviation amount) between the measured position X and the target position Y.

Concentric circles centered on the target position Y that is set at the time of starting the dynamic positioning control are provided to indicate a spacing degree between the measured position X and the target position Y. A plurality of (in the present embodiment, two) concentric circles are provided so that the number of concentric circles corresponds to the number of the fixed-point deviation amount levels 20. A concentric circle at the inner side has a radius B, and a concentric circle at the outer side has a radius C.

Specifically, in a case where the fixed-point deviation amount is expressed by L≤L1, the fixed-point deviation amount level 20 is "high" (level 1) or "intermediate" (level 2), and the measured position X of the ship 100 is estimated to be within the concentric circle at the inner side. In a case where the fixed-point deviation amount is expressed by L1<L≤L2, the fixed-point deviation amount level 20 is "low" (level 3), and the measured position X of the ship 100 is estimated to be within the concentric circle at the outer side. In a case where the fixed-point deviation amount is expressed by L>L2, the fixed-point deviation amount level 20 is "deviation" (level 4), and thus the measured position X of the ship 100 cannot be estimated. Note that a relation between the values of L1 and L2 is expressed by L1<L2 (see FIG. 6A). The embodiment illustrated in FIG. 6B shows a state where the fixed-point deviation amount level 20 is "low".

Figure 7A:
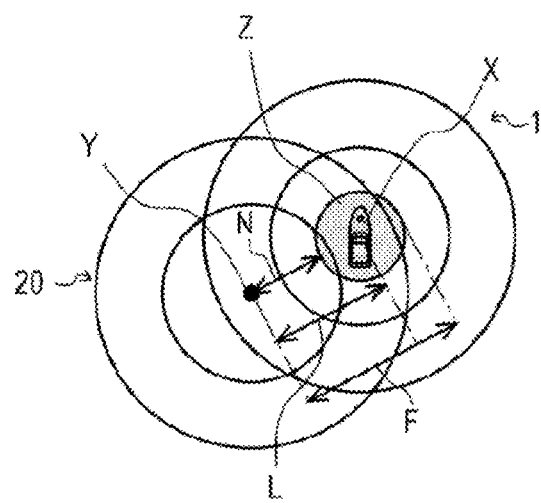
FIG. 7A is a view schematically illustrating an assumed range of an absolute position of the ship relative to a target position while the positioning accuracy level is "high" and the fixed-point deviation amount level is "low"
Figure 7B:
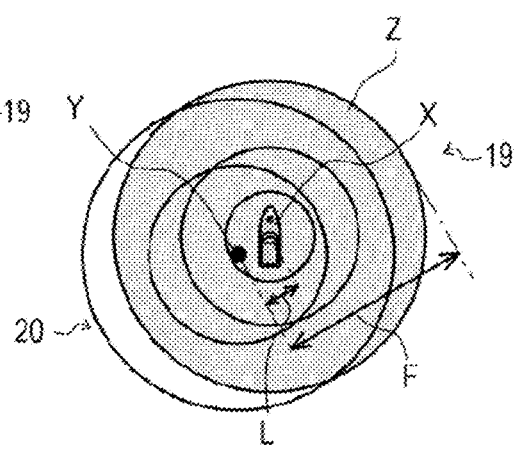
FIG. 7B is a view schematically illustrating an assumed range of an absolute position of the ship relative to a target position while the positioning accuracy level is "low" and the fixed-point deviation amount level is "high".

With reference to FIGS. 7A and 7B, the following will describe a method for determining a fixed-point maintaining accuracy level 21 indicative of an assumed range of an absolute position Z of the ship 100 relative to a target position Y. The fixed-point maintaining accuracy level 21 refers to a degree of how far the absolute position Z of the ship 100 may potentially be away from the target position Y.

In FIG. 7A, the positioning accuracy level 19 is "high". Therefore, the absolute position Z of the ship 100 is estimated to be within, among the concentric circles centered on the measured position X of the ship 100, the concentric circle at the innermost position. The shortest value N and the longest value F of the distance between the target position Y and the absolute position Z of the ship 100 is as illustrated in FIG. 7A. In this state, a difference between the shortest value N and the longest value F is 2A, which is equal to a diameter of, among the concentric circles indicative of the positioning accuracy level 19, the concentric circle at the innermost position. This difference between the shortest value N and the longest value F is smaller than that in the state illustrated in FIG. 7B. Thus, the positioning accuracy level 19 less affects the fixed-point maintaining accuracy level 21 than does the fixed-point deviation amount level 20. Therefore, by calculating the fixed-point maintaining accuracy level 21 mainly based on the fixed-point deviation amount level 20, it is possible to yield an approximate fixed-point maintaining accuracy level 21.

In FIG. 7B, the positioning accuracy level 19 is "low". Therefore, the absolute position Z of the ship 100 is estimated to be within, among the concentric circles centered on the measured position X of the ship 100, the concentric circle at the outermost position. The shortest value N of the distance between the target position Y and the absolute position Z of the ship 100 is 0, and the longest value F between the target position Y and the absolute position Z of the ship 100 is as illustrated in FIG. 7B. In this case, a difference between the shortest value N and the longest value F is greater than that of FIG. 7A. Thus, the positioning accuracy level 19 affects the fixed-point maintaining accuracy level 21 more greatly than does the fixed-point deviation amount level 20. Therefore, by calculating the fixed-point maintaining accuracy level 21 mainly based on the positioning accuracy level 19, it is possible to yield an approximate fixed-point maintaining accuracy level 21.

Figure 8:
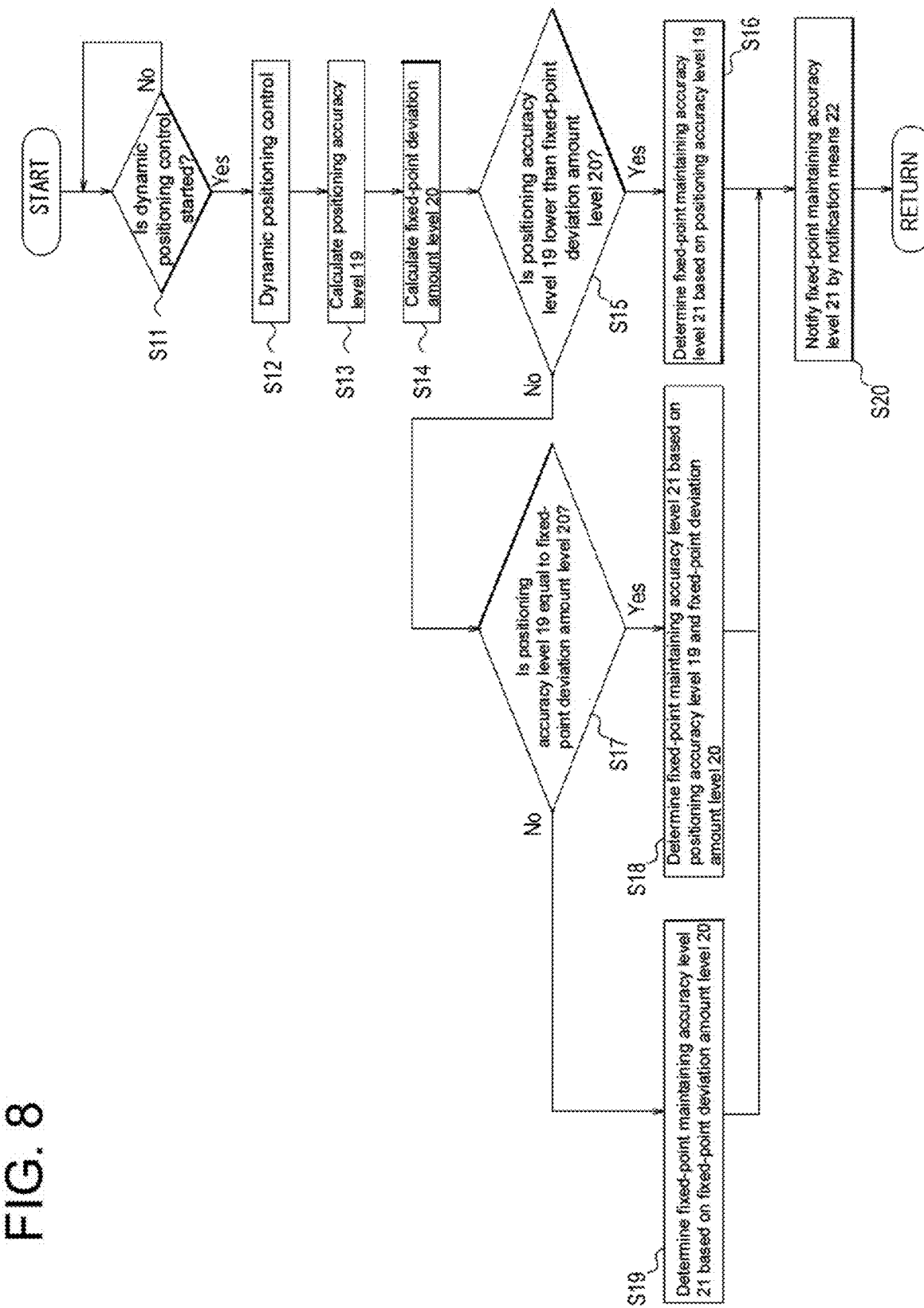
FIG. 8 is a flowchart illustrating how a fixed-point maintaining accuracy level is determined in dynamic positioning control.
Figure 9A:
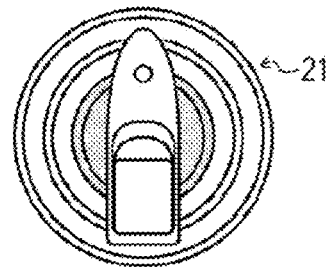
FIG. 9A is a view illustrating an example of indication of the fixed-point maintaining accuracy level that is "high"
Figure 9B:
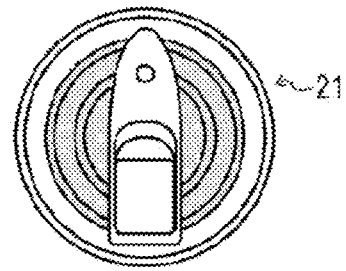
FIG. 9B is a view illustrating an example of indication of the fixed-point maintaining accuracy level that is "intermediate"
Figure 9C:
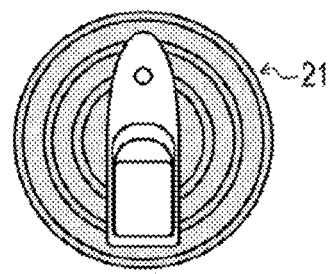
FIG. 9C is a view illustrating an example of indication of the fixed-point maintaining accuracy level that is "low"
Figure 9D:
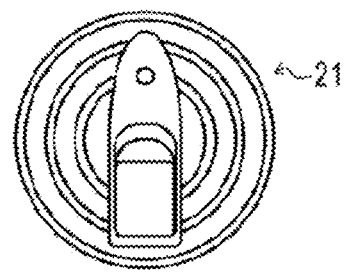
FIG. 9D is a view illustrating an example of indication of the fixed-point maintaining accuracy level that is "deviation".

With reference to FIG. 8, the following will further describe the method for determining a fixed-point maintaining accuracy level 21 indicative of an assumed range of an absolute position Z of the ship 100 relative to a target position Y. The fixed-point maintaining accuracy level 21 is determined with reference to the positioning accuracy level 19 and the fixed-point deviation amount level 20. In the present embodiment, a lower one of the positioning accuracy level 19 and the fixed-point deviation amount level 20 that have been calculated is determined as the fixed-point maintaining accuracy level 21. Meanwhile, if the positioning accuracy level 19 and the fixed-point deviation amount level 20 are equal to each other, both of these levels are determined as the fixed-point maintaining accuracy level 21.

In a case where the positioning accuracy level 19 is "low" (level 3) and the fixed-point deviation amount level 20 is "high" (level 1) or "intermediate" (level 2), the level of the positioning accuracy level 19, which is lower than the fixed-point deviation amount level 20, is determined as the fixed-point maintaining accuracy level 21. In a case where the positioning accuracy level 19 is "low" (level 3) and the fixed-point deviation amount level 20 is low (level 3), the positioning accuracy level 19 and the fixed-point deviation amount level 20 are equal to each other, and thus both of the levels are determined as the fixed-point maintaining accuracy level 21. In a similar manner, in a case where the positioning accuracy level 19 is "high" (level 1) and the fixed-point deviation amount level 20 is "low" (level 3), the level of the fixed-point deviation amount level 20, which is lower than the positioning accuracy level 19, is determined as the fixed-point maintaining accuracy level 21.

In a case where the fixed-point maintaining accuracy level 21 is "high" (level 1), the absolute position Z of the ship 100 is estimated to be within the concentric circle being centered on the target position Y and having the radius A. In a case where the fixed-point maintaining accuracy level 21 is "intermediate" (level 2), the absolute position Z of the ship 100 is estimated to be within the concentric circle being centered on the target position Y and having the radius B. In a case where the fixed-point maintaining accuracy level 21 is "low" (level 3), the absolute position Z of the ship 100 is estimated to be within the concentric circle being centered on the target position Y and having the radius C. In a case where the fixed-point maintaining accuracy level 21 is "deviation" (level 4), the absolute position Z of the ship 100 cannot be estimated.

As described above, a lower one of the positioning accuracy level 19 and the fixed-point deviation amount level 20 that have been calculated is determined as the fixed-point maintaining accuracy level 21. Meanwhile, if the positioning accuracy level 19 and the fixed-point deviation amount level 20 are equal to each other, both of these levels are determined as the fixed-point maintaining accuracy level 21. Consequently, it is possible to easily calculate an assumed range of the absolute position Z of the ship 100 relative to the target position Y.

Note that the fixed-point maintaining accuracy level 21 may be calculated accurately based on the positioning accuracy level 19 and the fixed-point deviation amount level 20 having been weighted according to importance with respect to the fixed-point maintaining accuracy level 21.

Next, with reference to FIG. 8, the following will describe conditions for starting the dynamic positioning control for maintaining the ship 100 at the target position Y and the target orientation Ya on the sea. Note that, when the dynamic positioning control is to be executed, the driving power of the ship 100 is not stopped and the propulsion device is active on the sea.

In step S11, it is determined whether or not an instruction to start the dynamic positioning control has been given. The dynamic positioning control is started when the dynamic positioning control switch 10A is operated to be turned on. If the instruction to start the dynamic positioning control has been given, the process advances to step S12. In response to turning-on of the dynamic positioning control switch 10A, the GNSS device 13 receives a signal from a satellite. The position and the orientation of the ship 100 on the sea measured at the time of turning-on of the dynamic positioning control switch 10A are set as a target position Y and a target orientation Ya, respectively.

In step S12, the dynamic positioning control is executed. In the dynamic positioning control, the ECUs 16 are controlled so that a thrust given by the propulsion device is balanced with an external force including a wind force and a tidal force. By the control of the ECUs 16, the ship 100 can be automatically maintained at the setting position and the setting orientation on the sea.

In step S13, a positioning accuracy level 19 of the GNSS device 13 is calculated. The positioning accuracy level 19 of the GNSS device 13 is calculated based on a radio-wave reception state defined by an elapsed time after power-on of the GNSS device 13 (described above), a dilution of precision observed at the time of determination of a position in a horizontal plane and is received from the GNSS device 13 (described above), and the number of effective satellites for the satellite positioning system (described above). Upon completion of the calculation of the positioning accuracy level 19 of the GNSS device 13, the process advances to step S14.

In step S14, a fixed-point deviation amount level 20 is calculated based on a fixed-point deviation amount calculated from a measured position X measured by the GNSS device 13 and the target position Y. Upon completion of the calculation of the fixed-point deviation amount level 20, the process advances to step S15.

In step S15, it is determined whether or not the positioning accuracy level 19 calculated is lower than the fixed-point deviation amount level 20. If it is determined that the positioning accuracy level 19 is lower than the fixed-point deviation amount level 20, the process advances to step S16. If it is determined that the positioning accuracy level 19 is not lower than the fixed-point deviation amount level 20, the process advances to step S17.

In step S16, a fixed-point maintaining accuracy level 21 is determined based on the positioning accuracy level 19. Upon determination of the fixed-point maintaining accuracy level 21, the process advances to step S20.

In step S17, it is determined whether or not the positioning accuracy level 19 is equal to the fixed-point deviation amount level 20. If it is determined that the positioning accuracy level 19 is equal to the fixed-point deviation amount level 20, the process advances to step S18. If it is determined that the positioning accuracy level 19 is not equal to the fixed-point deviation amount level 20, the process advances to step S19.

In step S18, the fixed-point maintaining accuracy level 21 is determined based on the positioning accuracy level 19 and the fixed-point deviation amount level 20. Upon determination of the fixed-point maintaining accuracy level 21, the process advances to step S20.

In step S19, the fixed-point maintaining accuracy level 21 is determined based on the fixed-point deviation amount level 20. Upon determination of the fixed-point maintaining accuracy level 21, the process advances to step S20.

In step S20, the fixed-point maintaining accuracy level 21 thus determined is notified by a notification means 22. After the notification, the process returns to the start.

The following will describe the notification means 22 for notifying the operator of the fixed-point maintaining accuracy level 21. In the present embodiment, the monitor 12 is used as the notification means 22. FIGS. 9A to 9D illustrate examples of indication of the fixed-point maintaining accuracy level 21 on the monitor 12.

The fixed-point maintaining accuracy level 21 is expressed by a plurality of (in the present embodiment, three) concentric circles whose number corresponds to the number of the fixed-point maintaining accuracy levels 21 with a ship body being displayed on the center of the concentric circles in a plan view and any of areas inside the concentric circles being indicated as one region with, e.g., a backlight. If the fixed-point maintaining accuracy level 21 is "high", an area inside the concentric circle at the innermost position is indicated as one region. If the fixed-point maintaining accuracy level 21 is "intermediate", an area inside the concentric circle at the middle position is indicated as one region. Specifically, the area inside the concentric circle at the middle position, including the area inside the concentric circle at the innermost concentric circle, is indicated as one region. If the fixed-point maintaining accuracy level 21 is "low", an area inside the concentric circle at the outermost position is indicated as one region. Specifically, the area inside the concentric circle at the outermost position, including the areas inside the concentric circles at the middle and innermost positions, is indicated as one region. If the fixed-point maintaining accuracy level 21 is "deviation", none of the concentric circles is indicated as one region.

In addition, a speaker or the like may be used as the notification means 22, and a notification sound may be made thereby. For example, in a case where the fixed-point maintaining accuracy level 21 is "deviation", notification of the fixed-point maintaining accuracy level 21 can be easily performed by making a notification sound.

In the present embodiment, the monitor 12 and the speaker or the like are used as the notification means 22. However, the present invention is not limited to such a configuration. Also, the present invention is not limited to the above-described examples of indication of the fixed-point maintaining accuracy level 21.

By displaying the fixed-point maintaining accuracy level 21 on the monitor 12 in the above-described manner, it is possible to easily notify the operator of an assumed range of the absolute position Z of the ship 100 relative to the target position Y. Consequently, for example, during the dynamic positioning control at a predetermined point, it is possible to make the operator alert to the situation and/or to allow the operator to predict a danger (e.g., the possibility of contact with an obstacle) according to the fixed-point maintaining accuracy level 21.

Figures 10A, 10B:
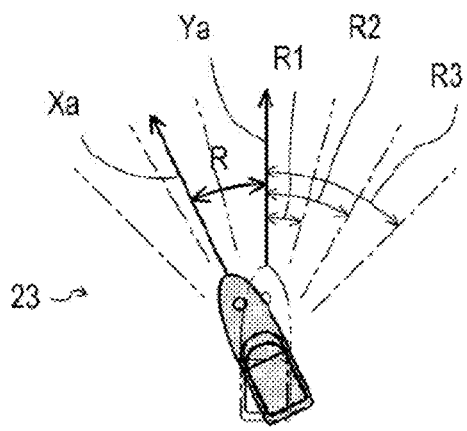
FIG. 10A is a table showing conditions of calculation of an orientation accuracy level.
FIG. 10B is a view schematically illustrating the orientation accuracy level.
Figure 11A:
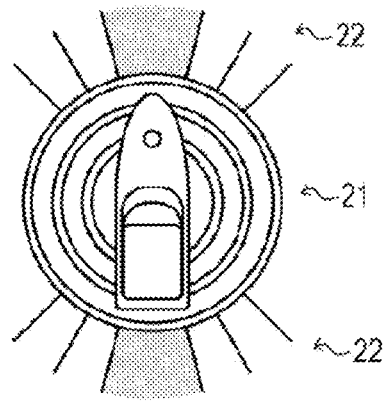
FIG. 11A is a view illustrating an example of indication of the orientation accuracy level that is "high"
Figure 11B:
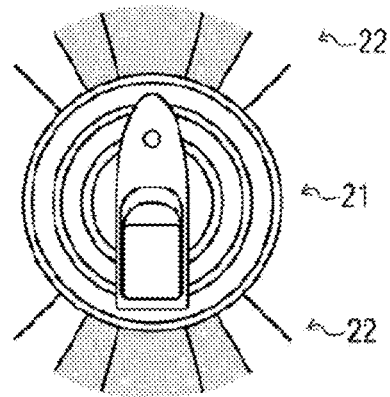
FIG. 11B is a view illustrating an example of indication of the orientation accuracy level that is "intermediate"
Figure 11C:
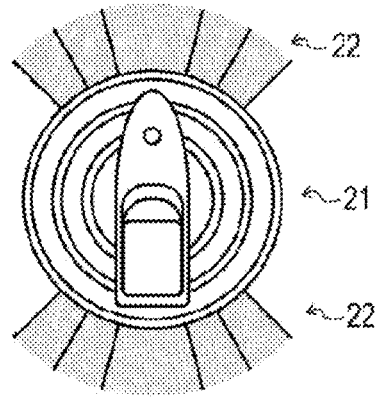
FIG. 11C is a view illustrating an example of indication of the orientation accuracy level that is "low"
Figure 11D:
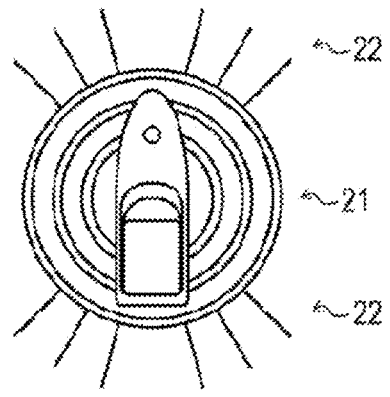
FIG. 11D is a view illustrating an example of indication of the orientation accuracy level that is "deviation".

With reference to FIGS. 10A and 10B, the following will describe an orientation accuracy level 23.

The ship handling control device 15 can detect the orientation accuracy level 23 with reference to a measured orientation Xa of the ship 100 measured by the heading sensor 14. The orientation accuracy level 23 is detected based on an orientation difference R between the measured orientation Xa and a target orientation Ya that is set at the time of starting the dynamic positioning control (see FIG.

10B). The orientation accuracy level 23 is set such that an orientation accuracy level 23 having a lower level represents a greater absolute value of an orientation difference R between a measured orientation Xa and a target orientation Ya.

As illustrated in FIG. 10A in a case where the orientation difference between the measured orientation Xa and the target orientation Ya is expressed by $-R1 \leq R \leq R1$, the orientation accuracy level 23 is "high". In a case where the orientation difference is expressed by $-R2 \leq R < -R1$ or $R < R \leq R2$, the orientation accuracy level 23 is "intermediate". In a case where the orientation difference is expressed by $-R3 \leq R < -R2$ or $R2 < R \leq R3$, the orientation accuracy level 23 is "low". In a case where the orientation difference is expressed by $-R3 > R$ or $R3 < R$, the orientation accuracy level 23 is "deviation". A relation between the values of R1, R2, and R3 is expressed by $R1 < R2 < R3$.

With reference to FIGS. 11A to 11D, the following will describe examples of indication of the orientation accuracy level 23. The orientation accuracy level 23 can be indicated together with the fixed-point maintaining accuracy level 21. Lines are provided to extend radially from the center of the plurality of concentric circles displayed for the fixed-point maintaining accuracy level 21. The lines are provided to extend radially at angles R1, R2, and R3 relative to a longitudinal direction of the ship body in the concentric circles. These lines are indicated only in the outside of the concentric circle at the outermost position among the plurality of concentric circles. The orientation accuracy level 23 is expressed by indicating, as one region, any of areas between the lines extending at predetermined angles (angles of R1, R2, and R3).

Specifically, in a case where the orientation accuracy level 23 is "high", an area corresponding to an angle from -R1 to R1 is indicated as one region. In a case where the orientation accuracy level 23 is "intermediate", an area corresponding to an angle from -R2 to R2 is indicated as one region. In a case where the orientation accuracy level 23 is "low", an area corresponding to an angle from -R3 to R3 is indicated as one region. In a case where the orientation accuracy level 23 is "deviation", none of the areas is indicated as one region.

By displaying the orientation accuracy level 23 on the monitor 12, it is possible to easily notify the operator of a deviation of the measured orientation Xa of the ship 100 from the target orientation Ya. Consequently, for example, especially in a case of large ships, during the dynamic positioning control at a predetermined point, it is possible to make the operator alert to the situation and/or to allow the operator to predict a danger (e.g., the possibility of contact with an obstacle) according to the orientation accuracy level 23. The present invention is not limited to the examples of indication of the orientation accuracy level 23.

INDUSTRIAL APPLICABILITY

The present invention is applicable to a ship handling device.

REFERENCE SIGNS LIST 1 ship body
10A dynamic positioning control switch
12 monitor
13 GNSS device
14 heading sensor
15 ship handling control device
19 positioning accuracy level
20 fixed-point deviation amount level
21 fixed-point maintaining accuracy level
22 notification means
23 orientation accuracy level

The invention claimed is:

1. A ship handling device for performing dynamic positioning control for maintaining a ship body at a target position with use of a satellite positioning system, the ship handling device comprising:
a ship handling control device configured to:
determine a positioning accuracy level of the satellite positioning system based on a radio-wave reception state of the satellite positioning system,
determine a fixed-point deviation amount level based on a fixed-point deviation amount calculated from the target position and a measured position measured by the satellite positioning system, and
determine a fixed-point maintaining accuracy level indicative of an assumed range of an absolute position of the ship body relative to the target position based on the positioning accuracy level and the fixed-point deviation amount level.

2. The ship handling device according to claim 1, wherein:
the positioning accuracy level and the fixed-point deviation amount level are compared to each other such that:
in a case where the positioning accuracy level is lower than the fixed-point deviation amount level, the positioning accuracy level is determined as the fixed-point maintaining accuracy level,
in a case where the fixed-point deviation amount level is lower than the positioning accuracy level, the fixed-point deviation amount level is determined as the fixed-point maintaining accuracy level, and
in a case where the positioning accuracy level and the fixed-point deviation amount level are equal to each other, the positioning accuracy level and the fixed-point deviation amount level are determined as the fixed-point maintaining accuracy level.

3. The ship handling device according to claim 1, further comprising a notification means for notifying an operator of the fixed-point maintaining accuracy level.

4. The ship handling device according to claim 1, wherein:
the radio-wave reception state of the satellite positioning system is determined based on an elapsed time after power-on of the satellite positioning system, a dilution of precision observed at a time of determination of a position in a horizontal plane and is received from the satellite positioning system, and a number of effective satellites for the satellite positioning system.

5. The ship handling device according to claim 1, wherein the ship handling control device comprises a CPU.

6. The ship handling device according to claim 1, wherein the ship handling control device comprises a ROM, a RAM or an HDD.

7. The ship handling device according to claim 1, wherein the fixed-point maintaining accuracy level is based on a shortest distance value the absolute position of the ship body may be from the measured position and a longest distance value the absolute position of the ship body may be from the measured position, the shortest distance value and the longest distance value based on the positioning accuracy level.

8. The ship handling device according to claim 7, wherein the assumed range is from the shortest distance value the absolute position of the ship body may be from the measured position to the longest distance value the absolute position of the ship body may be from the measured position.

9. An apparatus comprising:
a ship handling control device configured to:
determine a measured position of a ship via a satellite positioning system;
determine an accuracy level of the satellite positioning system, the accuracy level including a shortest distance value an absolute position of the ship may be from the measured position of the ship and a longest distance value the absolute position of the ship may be from the measured position of the ship;
determine a distance between a target position of the ship and the measured position of the ship; and
determine a range of absolute positions of the ship relative to the target position, the range based on the shortest distance value and the longest distance value the ship may be from the measured position of the ship.

10. The apparatus according to claim 9, wherein the ship handling control device comprises a CPU.

11. The apparatus according to claim 9, wherein the ship handling control device comprises ROM, a RAM, or an HDD.

12. The apparatus according to claim 9, wherein the ship handling control device is further configured to maintain a position of the ship relative to the target position.

13. The apparatus according to claim 9, wherein the ship handling control device is further configured to send a signal to a notification device, the notification device configured to indicate the range of absolute positions of the ship relative to the target position based on receiving the signal.

14. The apparatus according to claim 9, wherein the accuracy level is based on an a radio-wave reception state of the satellite positioning system.

15. The apparatus according to claim 14, wherein the radio-wave reception state is based on an elapsed time after the satellite positioning system is activated, a horizontal dilution of precision of the satellite position system, a number of satellites communicating with the satellite positioning system, or a combination thereof.

16. The apparatus according to claim 9, wherein the ship handling control device is further configured to compare the accuracy level and the distance between the target position of the ship and the measured position of the ship.

17. The apparatus according to claim 16, wherein based on a difference between the shortest din value the ship may be from the measured position of the ship and the longest din value the ship may be from the measured position of the ship being less than the distance between the target position and the measured position of the ship, the range of absolute positions of the ship relative to the target position is set as the distance between the target position and the measured position of the ship.

18. The apparatus according to claim 16, wherein based on a difference between the shortest din value the ship may be from the measured position of the ship and the longest din value the ship may be from the measured position of the ship being greater than the distance between the target position and the measured position of the ship, the range of absolute positions of the ship relative to the target position is set as the range between the shortest distance value the ship may be from the measured position of the ship and the longest distance value the ship may be from the measured position of the ship of the accuracy level.

19. A method comprising:
determining a measured position of a ship via a satellite positioning system;
determining an accuracy level of the satellite positioning system, the accuracy level including a shortest distance value the ship may be from the measured position of the ship and a longest distance value the ship may be from the measured position;
determining a distance between a target position of the ship and the measured position of the ship; and
determining a range of absolute positions of the ship relative to the target position, the range based on the shortest distance value and the longest distance value the ship may be from the measured position of the ship.

20. The method according to claim 19, further comprising:
comparing the accuracy level and the distance between the target position of the ship and the measured position of the ship;
setting, based on a difference between the shortest distance value the ship may be from the measured position of the ship and the longest distance value the ship may be from the measured position of the ship being less than the distance between the target position and the measured position of the ship, the range of absolute positions of the ship relative to the target position as the distance between the target position and the measured position of the ship; and
setting, based on a difference between the shortest distance value the ship may be from the measured position of the ship and the longest distance value the ship may be from the measured position of the ship being greater than the distance between the target position and the measured position of the ship, the range of absolute positions of the ship relative to the target position as the range between the shortest distance value the ship may be from the measured position of the ship and the longest distance value the ship may be from the measured position of the ship.

\* \* \* \* \*